Oct. 13, 1970    TAKAKIYO ITO ET AL    3,534,388
PLASMA JET CUTTING PROCESS
Filed March 10, 1969    2 Sheets-Sheet 1
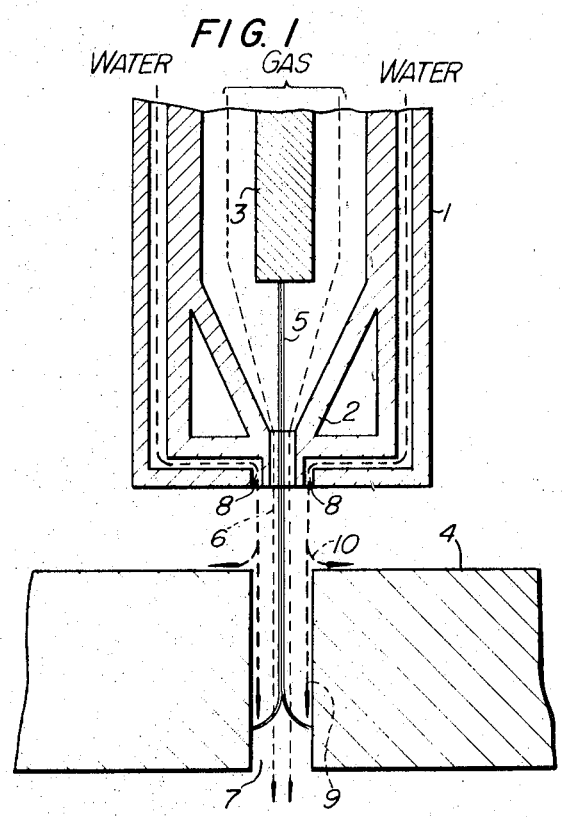
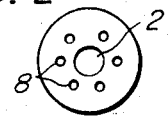
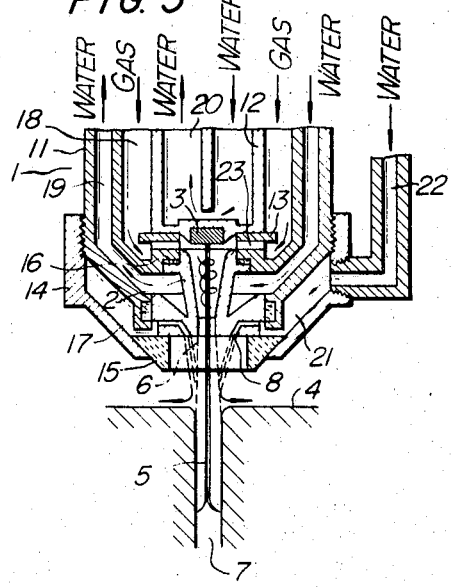
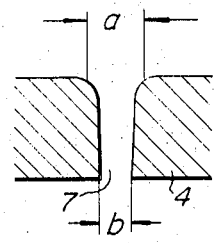
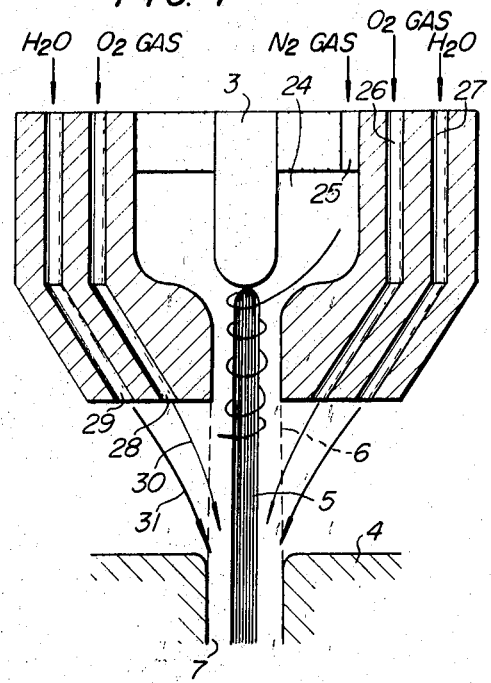
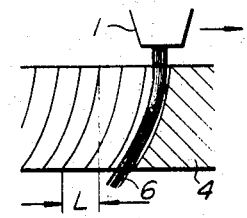
INVENTORS
TAKAKIYO ITO; TAKAYUKI KASHIMA;
OSAMU AKIYAMA AND MINORU SHIMADA
BY Craig, Antonelli, Stewart & Hill
ATTORNEYS (a) WATER NOT ADDED
(b) WATER ADDED AT 300 cc/min (a) WATER NOT ADDED
(b) WATER ADDED AT 700 cc/min (a) WATER NOT ADDED
(b) WATER ADDED AT 700 cc/min

United States Patent Office 3,534,388
Patented Oct. 13, 1970

3,534,388
PLASMA JET CUTTING PROCESS
Takakiyo Ito, Tokyo, Takayuki Kashima, Ichikawa-shi, Osamu Akiyama, Funabashi-shi, and Minoru Shimada, Tokyo, Japan, assignors to Hitachi, Ltd., Tokyo, Japan, a corporation of Japan
Filed Mar. 10, 1969, Ser. No. 805,623
Claims priority, application Japan, Mar. 13, 1968, 43/15,834
Int. Cl. B23k 9/00, 9/16
U.S. Cl. 219—121                3 Claims

ABSTRACT OF THE DISCLOSURE

A plasma jet cutting process, wherein water is supplied to the cut end of a work from the outside of a nozzle of a plasma torch along the periphery of a plasma jet flame, so as to prevent the hanging of the cut end by effectively cooling the cutting end with the evaporation heat of water, and to make the section smooth by the chemical effect of the water added to the plasma jet flame and increase the cutting speed when the work is cut with the plasma jet flame.

BACKGROUND OF THE INVENTION

Field of the invention

This invention relates to an improvement in the cutting process of a work which uses a plasma jet flame.

Description of the prior art

More than ten years have passed since the plasma jet flame was first used to cut mild steel or other materials, but much room is left for improvement, e.g. quality of the section, cutting speed, etc.

Namely, since the cut end of a work facing the torch side receives radiant heat of the plasma jet flame which comes from the torch to the work and receives more incident heat compared with the other parts when the work is cut by the plasma jet flame, the fused part becomes wide and round. Thus, a secondary process becomes necessary to eliminate the roundness of the cut end according to the purpose. Further, when nitrogen gas is used as plasma generating gas and stainless steel or nonferrous metals like aluminum are cut, the cut end becomes quite irregular and dross consisting of nitrides, etc. tends to adhere to the cut end. The quantity of the adhered dross becomes large and more difficult to eliminate as the cutting speed increases. As a consequence, the maximum cutting speed is limited.

On the other hand, high cutting speed with lower cost is desirable from an economic point of view.

In view of this purpose, an attempt has been made to add active gas like oxygen, water vapour, etc. to the gas flow passing through the nozzle of the plasma torch and generate more heat at the section by the chemical effect of the active gas on the work. In this method, however, the electrode in the nozzle is exposed to the active gas heated to high temperatures and it is technically difficult to protect the electrode completely from the erosive action of the active gas even if the end part of the electrode is shielded with the inactive gas flow. Thus, said method suffers from the defect that the electrode is easily exhausted and a stable plasma jet cannot be maintained for a long time.

SUMMARY OF THE INVENTION

An object of this invention is to provide an effective method of preventing the cut end from becoming round or hanging due to the high temperature heat of the plasma jet flame.

Another object of the invention is to give the chemical effect to the plasma jet flame without increasing the exhaustion of the electrode and thereby increase the cutting ability.

A further object of the invention is to improve the quality of the cut end by reducing the irregularity and the adhesion of dross when cutting stainless steel or nonferrous metals like aluminum.

A yet further object of the invention is to provide an economical method which improves the quality of the cut end and enhances the cutting ability.

According to the present invention there is provided a plasma jet cutting process comprising the steps of generating an arc between an electrode in a nozzle and another electrode, generating a plasma jet flame by passing said arc and a gas flow enclosing an end part of said electrode through said nozzle and directing said plasma jet flame to the cutting end of a work, wherein water is fed to the cut end of the work from the outside of the nozzle along the periphery of the plasma jet flame to cool the cut end of the work and to direct water vapor generated from said water to the cut end of the work as a part of the plasma jet flame.

Now, this invention will be described in more detail hereinbelow with reference to the accompanying drawings.

BRIEF DESCRIPTION OF THE DRAWINGS

FIG. 1 is a longitudinal sectional view of a plasma torch employed in the invention.

FIG. 2 is a bottom view of the plasma torch of FIG. 1.

FIG. 3 is a fragmentary longitudinal sectional view of another plasma torch suitable for this invention.

FIG. 4 is a longitudinal sectional view of an example of the plasma torch for directing water and an active gas together to a cutting end;

FIG. 5 is a sectional diagram showing the form of ends, wherein (a) shows the case were water is not supplied FIG. 6 is an elevational view of a cut end showing the relation between the cutting direction and the dragline length.

DESCRIPTION OF THE PREFERRED EMBODIMENTS

Figure 7:
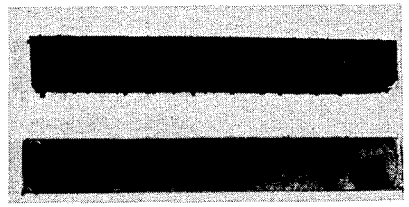
FIGS. 7, 8 and 9 are views showing the state of cut ends, wherein (a) shows the case where water is not supplied to the cut end and (b) shows the case where water is supplied to the cut end.

The plasma torch 1 shown in FIG. 1 is composed of a nozzle 2 which has an arc orifice at the center thereof and an inexhaustible electrode 3 whose end part is placed in the nozzle face to face with the inlet of the arc nozzle. Reference numeral 4 indicates a work to be cut and though not shown in the figure, a power supply is connected between the electrode 3 and the work 4 by the known method in such a way that the electrode 3 becomes negative. This connection is done when the work 4 is made to be one of the electrodes, but there may be employed a non-transfer type connection in which the work 4 is separated from the arc current circuit and the nozzle 2 is made to be one of the electrodes.

The plasma generating gas (e.g. nitrogen gas) is supplied to the arc orifice of the nozzle 2 in a way to form a gas flow enclosing the end part of the electrode 3. Said gas flow is heated by an arc 5 ignited between the electrode 3 and the work 4 when it passes through the arc orifice. Then it turns into a strongly directional plasma jet flame 6 and blows out of the nozzle 2 to the body 4. Accordingly, when the work 4 and the torch 1 is moved in a direction perpendicular to the sheet of the drawing, the part of the work 4 where the plasma jet flame 6 hits, fuses and flows in the flow direction of the plasma gas. Thus, cut ends 7 are formed.

During the cutting process, a suitable amount of water which does not affect the stability of the plasma jet is supplied from a large number of small holes 8 provided around the arc orifice of the nozzle 2 to the cut ends 7 of the work along the circumference of the plasma jet flame 6. A part of the water enters the cut groove 7 as indicated by the arrow 9 and the rest flows along the upper surface of the work 4 as indicated by the arrow 10.

FIG. 3 shows another concrete example of the plasma jet torch suitable for this invention. The plasma torch 1 shown in FIG. 3 comprises an electrode holder 12 in a body 11 and an electrode chip 3 formed of inexhaustible material like tungsten is maintained at the end face of the electrode holder. A refractory spacer 13 surrounding the electrode chip 3 is inserted between the end face of the electrode holder 12 and the body 11. A nozzle 2 comprising an arc orifice at the center thereof is inserted into the end part of the body 11 so that the inlet of the arc orifice faces the electrode chip 3 and is fixed to the body 11 through the refractory spacer 13 by a nut 14 screwed to the body 11. In the body 11 there are separately provided a gas chamber 18 surrounding the electrode holder 12 and a water chamber 19 surrounding the nozzle 2 by packings 16 and 17. The electrode holder 12 also comprises an independent water chamber 20. The water chambers 19 and 20 are connected to the inlets and outlets of the cooling water for cooling the nozzle 2 and the electrode chip 3, respectively. Further, an independent water chamber 21 for supplying water to the cut ends of the work 4 is provided between the body 11 and the nut 14. Said chamber 21 is coupled with a water inlet 22 and large number of small holes 8 provided to a nozzle 15 so as to surround the arc orifice.

A plasma generating gas like nitrogen gas is introduced into the front part of the electrode chip 3 from the gas chamber 18 through a tangential channel 23 provided to the body 11, and whirls around an arc 5 ignited between the electrode chip 3 and the work 4 to make the arc 5 concentrated along the central line of the nozzle 2 and form a plasma jet flame 6 directed from the nozzle 2 to the work 4. At the same time, the water supplied from the water inlet 22 to the water chamber 21 is supplied through the small holes 8 to the cut ends of the work.

The whirling gas flow surrounding the arc 5 tends to dissipate into a radial direction after blowing out of the nozzle 2. Therefore, it is preferable to provide the small holes 8 in a direction skew to the plasma jet flame 6 as shown in FIG. 3 so as to supply water to the cut ends 7 oppositely to said gas flow. Thereby, the water supplied from the small holes 8 is directed to the cut end 7 along the axis of the plasma jet flame without spraying.

Generally, as shown in FIG. 5, the shoulder part of the cut end 7 formed by the plasma jet flame which receives a large amount of incident heat tends to become round and assume V-shape as a whole, but the local overheating of the shoulder part of the cut end is prevented by supplying water to the cut end as described hereinabove. As a result, the roundness of the shoulder part is reduced and a substantially rectangular cut end can be obtained. This is due to the cooling effect of the evaporation heat of water and no such observable effect is obtained by simply spraying an air current to the shoulder part of the cut end. In addition, water entering the cut end dissociates into oxygen and hydrogen molecules due to the high temperature of the plasma jet flame and the resulting nascent oxygen reacts chemically with the work and generates heat. The reaction heat is generated all over the cut end and adds further heat to the plasma jet flame. Thus, not only the quality of the cut end is improved, but also the cutting speed is increased due to the heat of reaction when a suitable amount of water is supplied to the cut end.

When this invention is applied to the cutting of stainless steel or nonferrous metals like aluminum, the unevenness or the ruggedness of the cut end plane is reduced and the adhesion of dross to the cut end is reduced. Thus, an unexpected effect that the face of the cut end becomes smooth is obtained.

When nitrogen only is used as the plasma generating gas to cut these materials, the amount of dross adhered thereto increases rapidly as the cutting speed is increased. According to this invention, however, it is possible to enhance the maximum cutting speed by more than 50% without the adherence of dross. The reason is not clear, but may be ascribed to the effect of the hydrogen dissociated from the water in the cut end.

It is already known that the plane of the cut end becomes smooth when hydrogen is added to the plasma generating gas, but the present invention consists in that the effects of improving the quality of the cut end and enhancing the cutting speed are obtained by adding a small amount of inexpensive water instead of adding other gases like hydrogen gas. Further, since water is added to the plasma jet flame outside of the nozzle according to this invention, no erosive effect will be imposed on the electrode in the nozzle. Thus, the cost necessary for the cutting process and a secondary processing of the cut end is reduced without increasing the exhaustion of the electrode.

It is a further possible to supply active gas like oxygen together with water to the cut end in order to enhance the cutting speed.

FIG. 4 shows a concrete example of a plasma torch used for this purpose. A plasma generating gas like nitrogen gas is introduced from an inlet 25 into a gas chamber 24 surrounding an electrode 3 of the plasma torch 1. Said gas flow passes through the arc orifice of a nozzle 2 together with an arc 5 ignited between the electrode 3 and a work 4 and blows out in the form of a plasma jet 6. An active gas and water enter from different inlets 26 and 27, pass through small holes 28 and 29 provided separately around the arc orifice and are fed to a cut end 7. Reference numeral 30 indicates an active gas flow and 31 indicates a water flow.

Now, some embodiments of the cutting process of this invention will be described.

EXAMPLE 1

A flow of 60 l./min. of nitrogen gas is passed a nozzle whose orifice is 4 mm. in inner diameter and 17 mm. in length and a plasma jet flame is generated with an electric input of 85 kw. to cut mild steel of 25 mm. in thickness. The observed values of the gradient of the cut end and the maximum cutting speed when water is added to the outer part of the plasma jet flame and when water is not added are compared in Table 1.

The gradient of the cut end means the value $(a-b)/2$, where $a$ is the upper width of the cut end shown in FIG. 5 and $b$ is the lower width and both values are measured when the cutting speed is 1 m./min.

TABLE 1

| | | | |
|---|---|---|---|
| Amount of water added (l./min.) | 0 | 0.8 | 0.8 |
| Amount of oxygen added (l./min.) | 0 | 0 | 50 |
| Gradient of cut end (mm.) | 2.1 | 1.4 | 1.4 |
| Maximum cutting speed (m./min.) | 1.25 | 1.5–1.75 | 1.9 |

EXAMPLE 2

A flow of 50 l./min. of nitrogen gas is passed through a nozzle whose orifice is 2.8 mm. in inner diameter and 17 mm. in length and a plasma jet flame is generated with an electrical input of 60 kw. to cut stainless steel of 25 mm. in thickness. The gradient of the cut end and the length of the dragline when water is added to the outer part of the plasma jet flame and when water is not added are compared in Table 2. Here, the length of dragline means the drag length L of the plasma jet flame 6 generated when the plasma torch 1 is moved in the direction of the arrow (FIG. 6) with respect to the work 4 for cutting and it is a measure of the cutting ability (as L is smaller, the thickness to be cut becomes larger).

TABLE 2

| | | |
|---|---|---|
| Amount of water added (l./min.) | 0 | 0.3 |
| Gradient of cut end (mm.) | 3.3 | 2.3 |
| Length of dragline (mm.) | 6.5 | 4.8 |
| Cutting speed (m./min.) | 1.5 | 1.5 |
| State of cut end | FIG. 7(a) | FIG. 7(b) |

The maximum cutting speeds at which dross is not adhered to the cut end are when water is not added—1.0 m./min.
when 0.3 l./min. of water is added—1.5 m./min.

EXAMPLE 3

A flow of 50 l./min. of nitrogen gas is passed through a nozzle whose orifice is 2.8 mm. in diameter and 17 mm. in length and a plasma jet flame is generated with an electric input of 60 kw. to cut stainless steel of 40 mm. in thickness. The gradient of the cut end and the length of the dragline when water is added to the outer part of the plasma jet flame and when water is not added are compared in Table 3.

TABLE 3

| | | |
|---|---|---|
| Amount of water added (l./min.) | 0 | 0.7 |
| Gradient of cut end (mm.) | 2.0 | 1.3 |
| Length of dragline (mm.) | 12.0 | 6.9 |
| Cutting speed (m./min.) | 0.5 | 0.5 |
| State of cut end | FIG. 8(a) | FIG. 8(b) |

The maximum cutting speeds at which dress is not adhered to the cut end are when water is not added—0.35 m./min.
when water is added at 0.7 l./min.—0.55 m./min.

EXAMPLE 4

A flow of 50 l./min. of nitrogen gas is passed through a nozzle whose orifice is 2.8 mm. in inner diameter and 17 mm. in length and a plasma jet flame is generated with an electrical input of 60 kw. to cut aluminum of 40 mm. in thickness. The gradient of the cut end and the length of the dragline when water is added to the outer part of the plasma jet flame and when water is not added are compared in Table 4.

TABLE 4

| | | |
|---|---|---|
| Amount of water added (l./min.) | 0 | 0.7 |
| Gradient of cut end (mm.) | 1.2 | 0.2 |
| Length of dragline (mm.) | 17.3 | 8.2 |
| Cutting speed (m./min.) | 0.6 | 0.6 |
| State of cut end | Fig. 9(a) | FIG. 9(b) |

The maximum cutting speeds at which dross is not adhered to the cut end are when water is not added—0.55 m./min.
when water is added at 0.7 l./min.—0.85 m./min.

Figure 8:
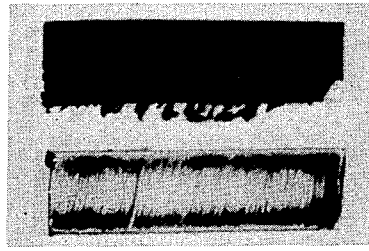
Figure 9:
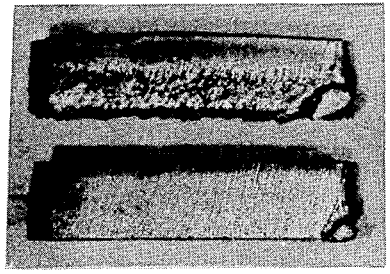

The black parts shown in FIGS. 7 to 9 show the dross, and the stripes show ruggedness of the cut end. It is seen that the smooth cut end to which dross is not adhered can be obtained according to this invention even when the cutting speed is enhanced remarkably compared with the speed in conventional methods.

Further, the burning of the end part of the torch exposed to high temperatures can also be prevented due to the cooling effect of water supplied to the cut end.

What is claimed is:

1. A plasma jet cutting process comprising the steps of generating an arc between an electrode in a nozzle and another electrode, generating a plasma flame by constricting said arc by passing said arc through the orifice of said nozzle together with a gas flow enclosing an end part of said electrode, and directing said plasma jet flame to the cutting end of a work, wherein water is supplied from a position spaced from said orifice along the periphery of said plasma jet flame to the shoulder part of the cut end of said work to cool said work and water vapor generated from said water is directed to the cut end of said work as a part of said plasma jet flame.

2. A process according to claim 1, wherein said gas flow is made of nitrogen when said work is stainless steel or a nonferrous metal.

3. A process according to claim 1, wherein an active gas is supplied together with said water to the cut end of the work.

References Cited

UNITED STATES PATENTS

| | | | |
|---|---|---|---|
| 1,775,532 | 9/1930 | Boeuf | 219—72 |
| 1,963,729 | 6/1934 | Alexay | 219—74 |
| 2,008,846 | 7/1935 | Zack | 219—74 |
| 2,900,485 | 8/1959 | Clark | 219—75 |
| 2,906,858 | 9/1959 | Morton | 219—74 |
| 2,919,341 | 12/1959 | Roth et al. | 219—74 |
| 2,963,570 | 12/1960 | Rieppel | 219—74 |
| 3,082,314 | 3/1963 | Arata et al. | 219—75 |

W. DEXTER BROOKS, Primary Examiner

U.S. Cl. X.R.

219—74